(12) United States Patent
Myatt et al.

(10) Patent No.: US 7,575,455 B2
(45) Date of Patent: Aug. 18, 2009

(54) ECCENTRIC POLYGONAL MAIN LEAD FLEXIBLE CONNECTOR ASSEMBLY

(75) Inventors: Leonard Myatt, Norfolk, MA (US); Robert A. Ward, Rockledge, FL (US); Aleksandar Prole, Winter Springs, FL (US); Lon W. Montgomery, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 11/807,391

(22) Filed: May 29, 2007

(65) Prior Publication Data

US 2008/0299785 A1    Dec. 4, 2008

(51) Int. Cl.
*H01R 4/60* (2006.01)

(52) U.S. Cl. ............... 439/196; 439/387; 174/15.6; 310/79

(58) Field of Classification Search ............ 439/32–33, 439/487, 196; 174/93, 94; 310/79
See application file for complete search history.

(56) References Cited

U.S. PATENT DOCUMENTS

| | | | | |
|---|---|---|---|---|
| 833,290 | A * | 10/1906 | Betts ................... | 174/94 R |
| 1,588,556 | A * | 6/1926 | Thompson ............. | 439/33 |
| 1,759,567 | A * | 5/1930 | Dibner ................. | 439/33 |
| 3,325,588 | A * | 6/1967 | Lear .................... | 174/94 R |
| 4,204,085 | A * | 5/1980 | Chapman et al. ....... | 174/86 |
| 5,736,670 | A * | 4/1998 | Carbonell et al. ...... | 174/15.6 |
| 6,155,869 | A * | 12/2000 | Monsef et al. ......... | 439/500 |
| 6,200,206 | B1 * | 3/2001 | Drees .................. | 451/270 |
| 6,439,907 | B1 * | 8/2002 | Rowe .................. | 439/196 |
| 6,538,339 | B2 * | 3/2003 | Krizek et al. .......... | 290/1 A |
| 6,649,826 | B1 * | 11/2003 | Rowe .................. | 174/15.6 |
| 6,948,939 | B1 * | 9/2005 | Kogan et al. .......... | 439/33 |
| 7,400,072 | B2 * | 7/2008 | Ward .................. | 310/71 |
| 2001/0033081 | A1 * | 10/2001 | Krizek et al. .......... | 290/1 A |
| 2006/0125343 | A1 * | 6/2006 | Ward .................. | 310/260 |

* cited by examiner

*Primary Examiner*—Hae Moon Hyeon
*Assistant Examiner*—Harshad C Patel

(57) ABSTRACT

In one embodiment the present invention is a Flexible Connector Assemblies (FCA) 6 that comprises top and bottom plates connected by Flexible Connectors (FC) 8 and provides a compliant electrical joint between the first terminal lead 2 and the second terminal lead 4. These terminal leads 2 and 4 are connected to the top and bottom plates eccentrically in such a way that the total current 16 through the FCA is more evenly distributed among the FC 8 than when the leads are centered on their respective plates. This improvement in uniformity reduces the maximum current carried by any one FC, which substantially extends the operating life of the component.

17 Claims, 4 Drawing Sheets

ECCENTRIC POLYGONAL MAIN LEAD FLEXIBLE CONNECTOR ASSEMBLY

FIELD OF THE INVENTION

The present invention relates to methods and apparatus for increasing the electrical current capacity of multiple flexible connector assemblies (FCA's), by distributing the total electrical current more evenly among the flexible connectors of each FCA.

BACKGROUND

In large scale electrical circuits, such as those used in the power generation industry, there are inherent problems in connecting some different conductors in the circuits. One of the problems is that some electrical conductors will move independently of one another. This difference in movement can be caused by the conductors experiencing a difference of temperature, vibration or other environmental factors. If an electrical connection between two conductors that move with respect to each other is rigid, then the electrical connection may wear rapidly and even break. Consequent overheating or electrical arcing at a degraded or broken electrical connection can cause severe damage to the connection itself, to the adjoining electrical conductors, and to the rest of the apparatus that houses the conductors.

FCA's have therefore been used to connect larger conductors electrically while allowing a difference of movement therebetween. One type of flexible connection, typical in water-cooled generators, is shown in FIG. 1. In this figure, a first electrical conductor (or lead) 2 is connected to a second electrical conductor (or lead) 4 via the FCA 6. The FCA comprises a series of electrically conductive and mechanically flexible connectors 8 that act as a mechanically flexible electrical bridge between the two electrical conductors. Differences of movement between the two conductors 2, 4 can be readily absorbed by the FCA 6.

Since large electrical currents need to pass through the FCA 6, multiple flexible connectors 8 are arranged in parallel to attempt to spread the current evenly across the FCA. However, electromagnetic phenomena that are inherent in such paralleled conductor assemblies cause the total current from one of the conductors 16 to pass in greater proportion through the outside flexible connectors 12, than through the inside flexible connectors 14. Therefore, the effective maximum current that this type of FCA can carry is limited since increasing the number of paralleled flexible connectors 8 has a diminishing improvement on the current capacity of the FCA. Further, the flexible connectors on the outer edges of the FCA wear proportionally faster than the interior flexible connectors since they carry a greater portion of the electrical current. This uneven distribution of current reduces the life expectancy of the FCA.

One technique for attempting to more evenly distribute the current among paralleled flexible connectors has been to arrange the flexible connectors circumferentially, as shown in FIG. 2, instead of linearly. In this figure an FCA 6 comprises a series of flexible connectors 8 that are evenly spaced circumferentially around the top plate 3 and the bottom plate 5 of a polygonal FCA. Current 16 passing from one conductor 2 to another 4 is now evenly distributed 18 among the various flexible connectors 8. A given FCA, however, is not used by itself, and each FCA will have multiple neighbors as part of a generator terminal assembly, as shown in FIG. 3. The electrical currents traveling through neighboring conductors may adversely affect the distribution of current among the flexible connectors within a given FCA.

FIG. 3 illustrates an example of an interior assembly of generator terminals 25. The conductors 2, 4 are centered in the FCA with the intent to evenly distribute the current load among the flexible connectors in the FCA. However, the electrical current 16 in each of the conductor assemblies 6 creates a magnetic flux 22. This flux interferes with the distribution of the current in the flexible connectors 8 in the neighboring conductors, causing an uneven distribution of the current among the flexible connectors.

What is needed is an FCA that evenly distributes electrical current among its component flexible connectors given the disrupting effects of its neighbors to thereby provides an increased overall current capacity.

SUMMARY OF THE INVENTION

With the foregoing in mind, methods and apparatus consistent with the present invention facilitate the creation of an FCA that more evenly distributes the current among the component flexible connectors when the FCA is part of a larger series of FCA's. The terminal leads are connected to the flexible connector eccentrically, and as a result the inductive effects that the series of FCA have on one another are balanced by the resistive effects of the eccentric placement of the terminal leads to create a more favorable current distribution among the component flexible connectors. This can be achieved by shifting the flex-connector assemblies towards the opposite lead of the same phase. The current is "encouraged" to use the nearby flexible connectors due to the lower resistance path, and "discouraged" from using the more distant flexible connectors due to the higher resistance path, thus improving the overall current uniformity across the FCA.

The arrangement of the FCA with their eccentrically located terminal leads can then be positioned such that the disruptive effects of the flux created by neighboring assemblies can be reduced. Without the eccentrically located terminal lead the inductive effects of the neighboring leads would cause the current to be carried unevenly through the flexible connectors.

These and other objects, features, and advantages in accordance with the present invention are provided by particular embodiments of an FCA apparatus that comprises a first terminal lead, a second terminal lead, and a top and bottom plate connected by flexible connectors. The first terminal lead is connected to the top plate eccentrically and a current passes into the FCA through the first terminal lead, and the current is substantially evenly distributed through the plurality of flexible connectors.

In particular embodiments the second terminal lead is connected to the bottom plate eccentrically, and may reflect the placement of the first terminal lead. In some embodiments the FCA is part of a hydrogen inner-cooled generator or a water-cooled generator.

In other embodiments the first terminal lead is connected to the top plate at a maximum possible distance from center. If a plurality of FCA's are used within a generator, the eccentric placement of the first terminal lead relative to the eccentric placement of other first terminal leads on other FCA's maintains a maximum distance between the first terminal leads along the generator's longitudinal axis.

In another embodiment the present invention provides for a multiple FCA apparatus where each of the FCA's comprises a first terminal lead, a second terminal lead, a top plate and bottom plate joined by flexible connectors. The terminal leads are connected to the plates eccentrically and in a similar position relative to each other. A current passes into the FCA through the first terminal lead. The multiple FCA's are aligned in a transverse and longitudinal direction within a generator, and the eccentrically placed leads are oriented at a maximum distance away from the other eccentrically placed leads on other FCA's along either the transverse or longitudinal direction.

In particular embodiments the leads are connected to the plates at a precisely determined distance from the center, whereby the current that passes into the FCA is not adversely affected by the presence of neighboring FCA's. Each FCA comprises the same number of flexible connectors.

In another embodiment of the present invention, a method of connecting a first conductor with a second conductor through an FCA includes eccentrically attaching a terminal lead of the first conductor to a top plate in the FCA. The method also includes aligning the second connector with a matching location on a bottom plate of the FCA and attaching a terminal lead of the second connector to the bottom plate. In some embodiments both the terminal leads are attached to the FCA at a maximum possible distance from the center to optimize the current flow through the FCA, while in other embodiments a precisely determined distance of the terminal lead's eccentric placement will be less than the maximum possible distance. Also the orientation of the leads may be based on neighboring FCA's.

Other embodiments of the present invention also exist, which will be apparent upon further reading of the detailed description.

DETAILED DESCRIPTION OF THE PREFERRED EMBODIMENTS

The present invention deals with flexible connector assemblies (FCA's), and more particularly with FCA's that have increased current capacity due to a more uniform current distribution within the flexible connector subcomponents amongst multiple neighboring FCA's. By placing a main lead eccentrically on an FCA, the disrupting effects of the magnetic flux caused by neighboring conductors can be reduced, therefore allowing a more uniform flow of electrical current through the flexible connectors in a given FCA. If isolated from the effects of neighboring main lead-FCA assemblies, a single main lead that is centrally connected to a single FCA will evenly distribute current flow among the flexible connectors in that FCA. However, when multiple FCA's are in proximity to one another, the magnetic flux generated by the neighboring FCA will disrupt the uniformity of current flow distribution among the flexible connectors.

Figure 1:
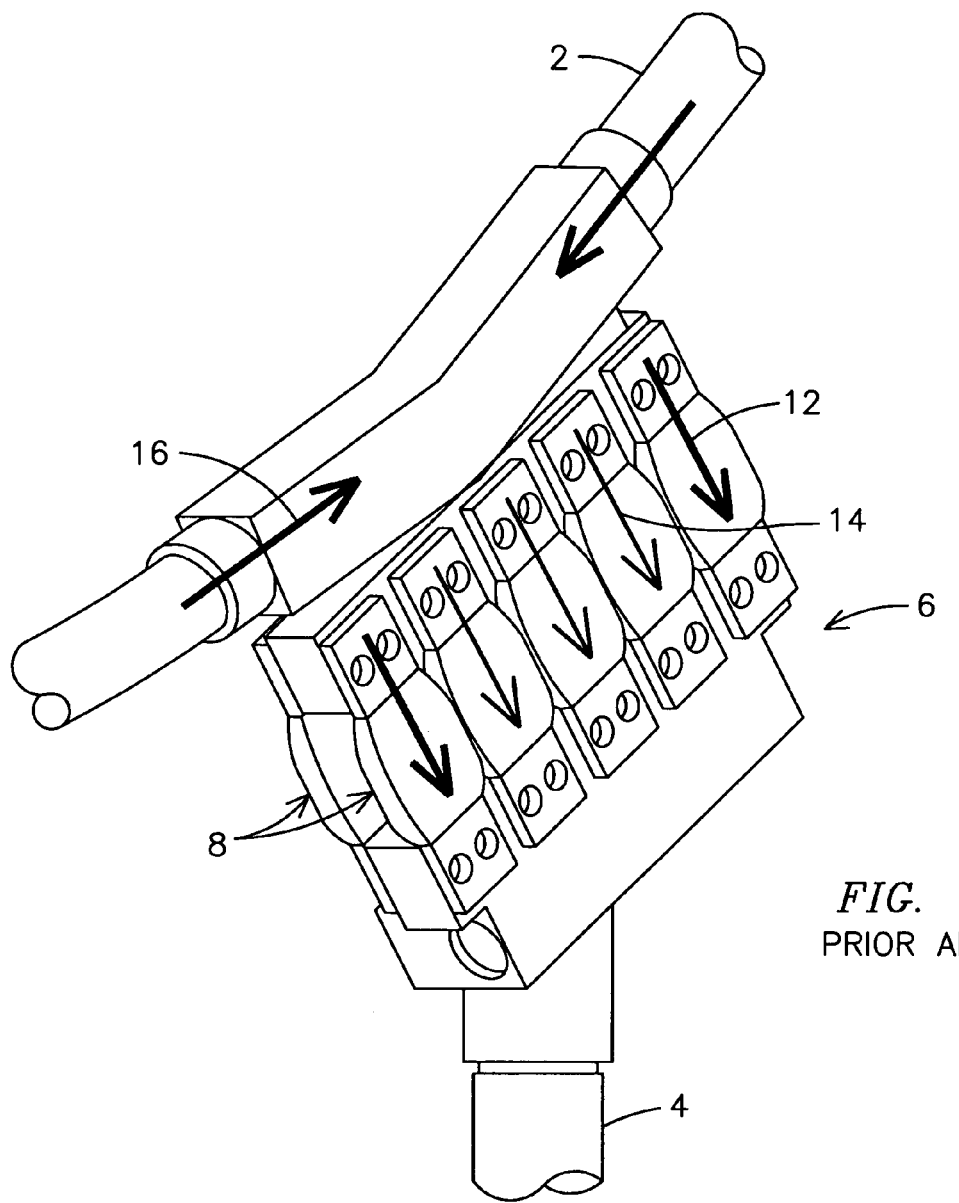
FIG. 1 illustrates a linear FCA according to the prior art.
Figure 4:
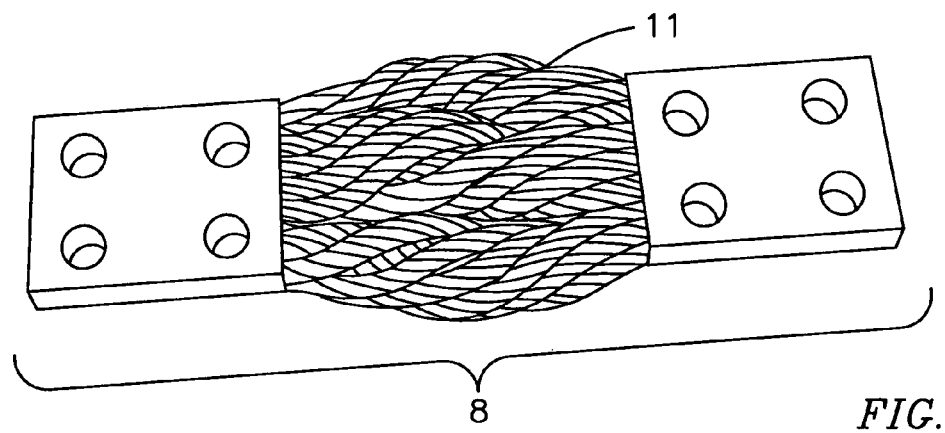
FIG. 4 illustrates a typical, uncovered flexible connector, according to the prior art.
Figure 2:
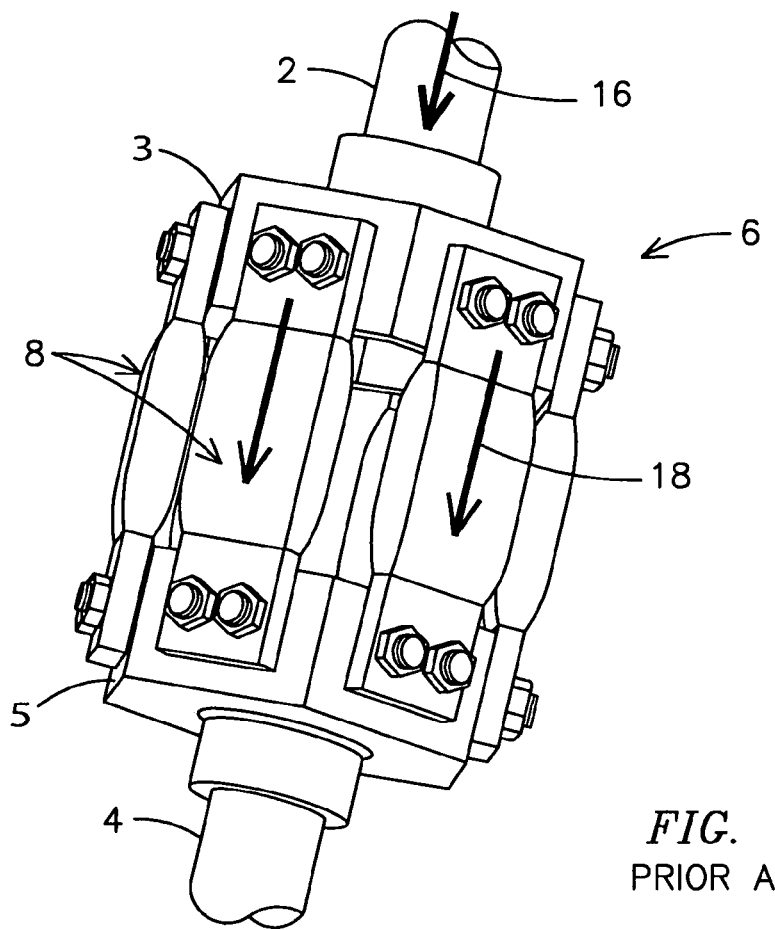
FIG. 2 illustrates a circular FCA according to the prior art.

Flexible connectors are the point in the assembly that allows for a difference of movement between adjacent, less flexible conductors. Flexible connectors tend to be cooled less intensively than other electrical conductors in the assembly. Thus, minimizing electrical losses in the connectors is important. Losses are minimized if the electrical currents are distributed uniformly among the flexible connectors in a given FCA. Flexible connectors are made primarily out of copper and copper alloys, but other material may be used as well. The flexibility in the flexible connector comes from the central braided portion 11, as shown in FIG. 4. This braided portion is typically covered by a plastic sheath to preserve integrity, as is depicted in the other figures. A typical Penn Union™ (Edinboro, Pa.) flexible connector will allow for lateral movement of about three quarters of an inch, depending upon model type and how the flexible connector is installed.

The present invention attaches the terminal conductors to the FCA eccentrically, in other words, off-center. This off-center placement actually allows for a more even flow of electrical current through the flexible connectors. In particular, the leads are placed as far from center on the FCA plates as possible to allow for maximum distance from other, neighboring FCA. By placing the leads eccentrically, a balance between resistive and inductive effects can be reached and the deleterious effects caused by neighboring assemblies are mostly canceled. Although it is clear that a single FCA with an eccentric lead will unevenly distribute a passing current, when used in conjunction with other FCA, the eccentric lead will distribute the passing current substantially more uniformly. This is because the magnetic flux created by a given FCA (inductive effects) disrupts the current distribution within its neighbors.

Figure 5:
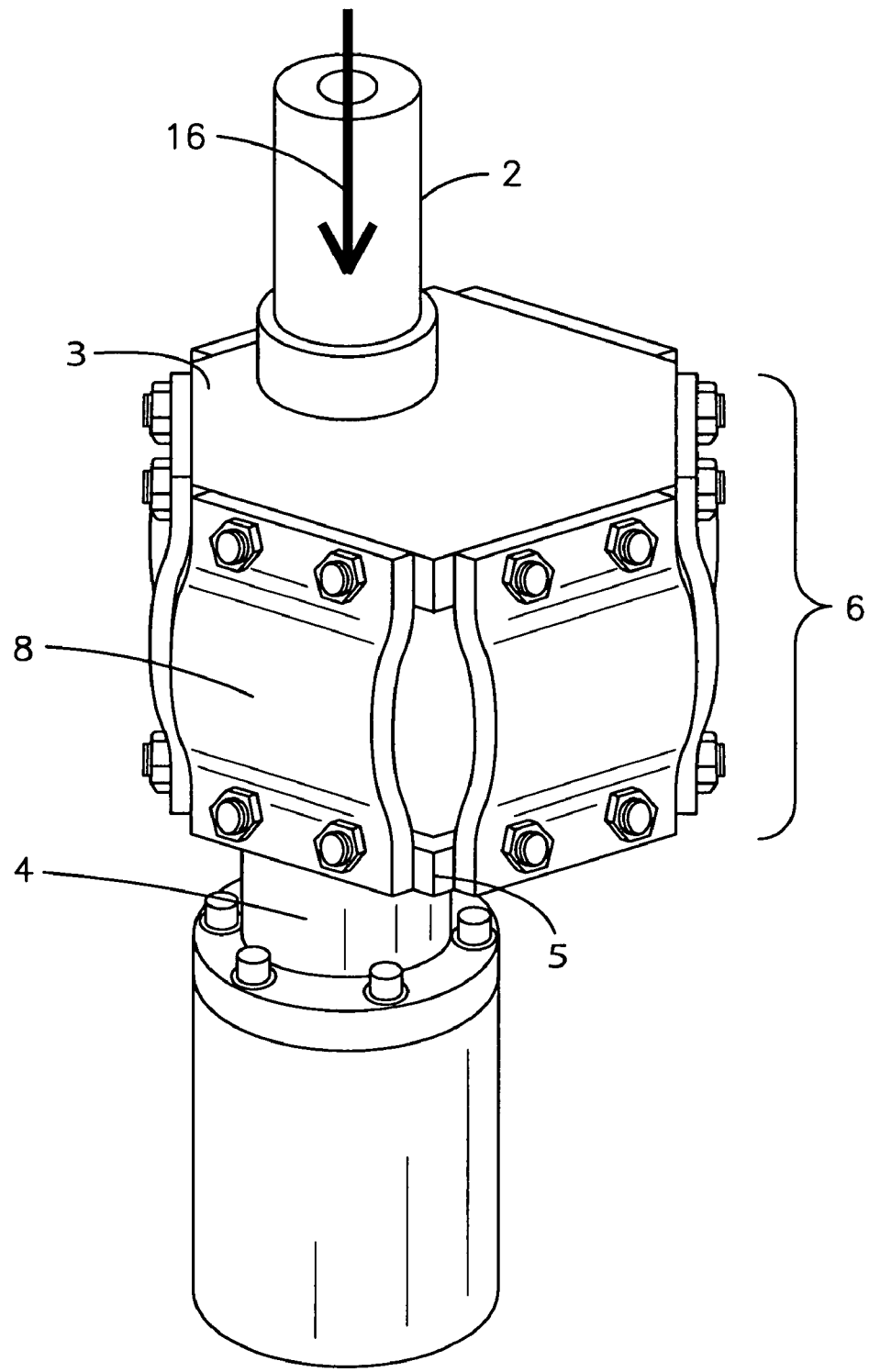
FIG. 5 illustrates an FCA with an eccentrically placed terminal lead, according to the present invention.

Referring to FIG. 5, an FCA 6 according to one embodiment of the present invention is shown. The terminal leads 2, 4 are eccentrically attached to the assembly's top 3 and bottom 5 plates. As used herein, the top plate refers to the plate that is connected to the main lead and the bottom plate refers to the plate that is connected to the bushing. If this assembly were used with a single flexible connector that had no neighbors, this arrangement would cause the current 16 carried into the assembly to pass unevenly over the flexible connectors 8, favoring the connectors closest to the lead attachment. However, due to the inductive effects produced by the neighboring assembly of FCA, the current will pass more evenly though the connectors 8 of eccentric assemblies of the present invention than traditional centered assemblies.

The exact distance of how far off-center the leads are connected will depend on the overall design of the generator terminal assembly. A more diffuse array of FCA will require a relatively small off-set, while a closely-spaced array will require a relatively large off-set. The precise location of the offset is determined by an accurate electromagnetic analysis of the design. Such an electromagnetic analysis is used to determine the dependence of the flexible connector current fraction upon the connector assembly offset. Subject to spatial constraints imposed by the entire generator terminal assembly, the offset that is chosen is the offset that results in distributing electrical current as evenly as possible among the flexible connectors in the FCA's.

Figure 6:
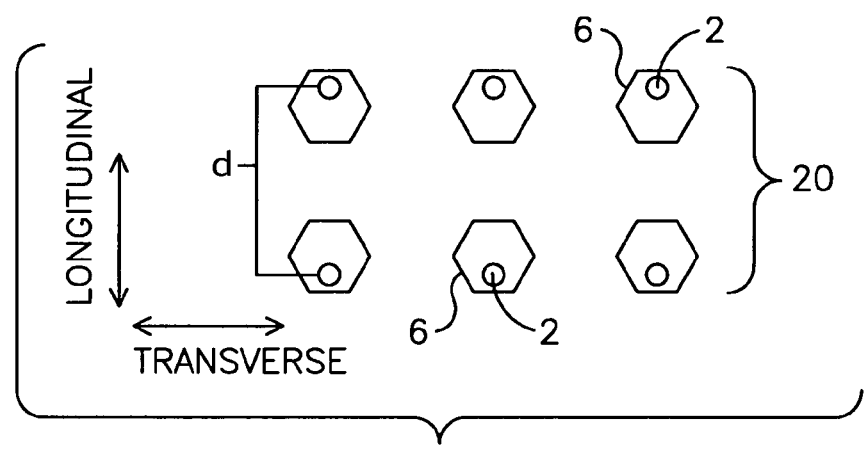
FIG. 6 illustrates how multiple FCA with eccentrically placed terminal leads are arranged according to one embodiment of the present invention.
Figure 3:
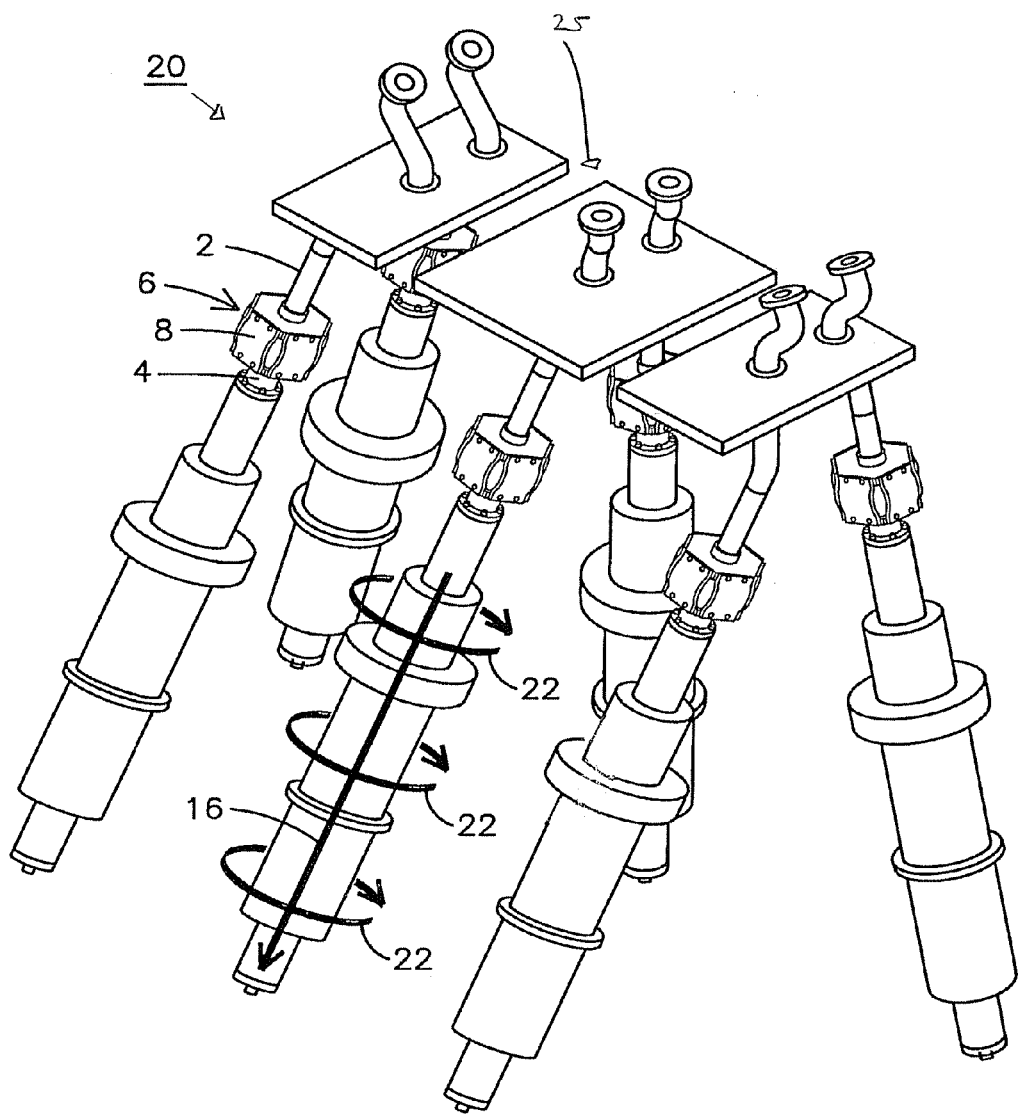
FIG. 3 illustrates the assembly of generator terminals and main leads of the prior art.

FIG. 6 illustrates a simplified plan view of the FCA top (or bottom) plates in the multiple FCA apparatus 20 from FIG. 3. Here the terminal leads 2 are attached to the FCA 6 and separated longitudinally, but otherwise are the same distances apart transversely. As shown, eccentric placement of the leads then have to be orientated vis a vis the other FCA's, and the distance d is chosen in response to electromagnetic influences of neighboring FCA's. Since inductive effects of adjacent FCA's are generally disruptive (i.e. causing non-uniform distribution of electrical currents among the flexible connectors in a given FCA), and since these inductive effects are intensified as the distance between adjacent leads is reduced, a basic principle is to have the leads arranged as far apart as possible to minimize these inductive influences. However, depending on the overall system requirements, i.e. spatial restrictions, it might be more important to keep the leads of certain assemblies closer than others. In addition, the configuration must prevent arcs and electrical strikes. This eccentric lead attachment can also create more space on the top and bottom surfaces for enhanced placement of devices such as water cooling pipes.

The number of connectors used can vary depending upon factors such as the total current and overall size restrictions, as well as the size of the flexible connectors. FCA's in hydrogen inner-cooled generators are typically Penn union™ 2"×6"×½" copper flexible connectors.

The flexible connectors may be attached by a variety of techniques known in the art such as riveting, hooking, brazing and clamping. Typically, however, they are bolted. This allows for flexibility in movement between the two conductors while maintaining sufficient electrical continuity.

Though one embodiment of the present invention is practiced on large scale, water-cooled generators, the invention may be practiced on different models and scales as required. For example, the present invention may be practiced on indirectly cooled generators ranging from 190 MVA to 550 MVA, hydrogen directly cooled generators ranging from 100 to 1000 MVA and water cooled generators ranging from 500 MVA to 2200 MVA. An expected use of the present invention is to be in the 2000 MVA water cooled generator now being produced by Siemens Power Generation™ for an advanced design nuclear power station in Finland.

In one embodiment the present invention provides for an FCA apparatus that comprises a first terminal lead 2, a second terminal lead 4, and a top 3 and bottom 5 plate connected by flexible connectors 8. The first terminal lead is connected to the top plate eccentrically and a current 16 passes into the FCA 6 through the first terminal lead, and the current is substantially evenly distributed through the flexible connectors.

The second terminal lead 4 is also connected to the bottom plate 5 eccentrically, reflecting the placement of the first terminal lead. In some embodiments the FCA is part of a hydrogen inner-cooled generator or a water-cooled generator.

In other particular embodiments the flexible connectors are evenly spaced around the FCA, and the total current carrying capacity of the FCA is approximately 50,000 amps. In some embodiments at least six flexible connectors are used in the FCA.

In other embodiments the first terminal lead 2 is connected to the top plate 3 at a prescribed distance from center. If a plurality of FCA 6 are used within a generator, and the eccentric placement of the first terminal lead relative to the eccentric placement of other first terminal leads on other FC apparatuses maintains a maximum distance between the first terminal leads along the generator's longitudinal axis.

In another embodiment the present invention provides for a multiple FCA apparatus 20 where each of the FCA comprise a first terminal lead 2, a second terminal lead 4, a top plate 3 and bottom 5 plate joined by flexible connectors 8. The terminal leads are connected to the plates eccentrically and in a similar position relative to each other. A current passes into the FCA 6 through the first terminal lead. The multiple FCA are aligned in a transverse and longitudinal direction within a generator and the eccentrically placed leads are oriented at maximum distance away from the other eccentrically placed leads on other FCA along either the transverse or longitudinal direction.

In particular embodiments the leads are connected to the plates at maximum distance from center, whereby the current passes into the FCA is not adversely affected. Each FCA comprises the same number of flexible connectors, which in many embodiments is six.

In another embodiment of the present invention, a method of connecting a first terminal lead 2 with a second terminal lead 4 through an FCA includes eccentrically attaching a terminal lead of the first conductor to a top plate 3 in the FCA 6. The method further includes aligning the second connector to a matching location on a bottom plate 5 of the FCA and attaching a terminal lead of the second connector to the bottom plate. In some embodiments both the terminal leads are attached to the FCA as far from center as possible without adversely affecting potential for current flow through the FCA. Also the leads may be orientated based upon a neighboring FCA.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

We claim:

1. A flexible connector assembly for use in a generator terminal assembly, the flexible connector assembly comprising:
    a first electrically conductive plate and a first lead connected thereto;
    a second electrically conductive plate and a second lead connected thereto; and
    a plurality of flexible conductors connecting the first and second electrically conductive plates together; said first lead connected to a non-central location of said first electrically conductive plate so that when the flexible connector assembly is adjacent at least one other flexible connector assembly of the generator terminal assembly, a current flowing in the flexible connector assembly is substantially evenly distributed among the respective plurality of flexible conductors.

2. A flexible connector assembly as in claim 1, wherein the flexible connector assembly is arranged in a line of opposing pairs of flexible connector assemblies; and wherein the first leads in each pair are more widely spaced than central locations of the corresponding first electrically conductive plates.

3. A flexible connector assembly as in claim 1, wherein said first and second plates comprise first and second polygonal plates.

4. A flexible connector assembly as in claim 1, wherein said plurality of flexible conductors are connected to said first electrically conductive plate at symmetric locations relative to a center thereof.

5. A flexible connector assembly as in claim 1, wherein a combined current carrying capacity of said plurality of flexible conductors is 50,000 amps.

6. A flexible connector assembly as in claim 1, wherein said first lead is connected to said first electrically conductive plate adjacent a perimeter thereof.

7. A flexible connector assembly for use in a generator terminal assembly, the flexible connector assembly comprising:
    a first electrically conductive plate and a first lead connected thereto;

a second electrically conductive plate and a second lead connected thereto; and a plurality of flexible conductors connecting the first and second electrically conductive plates together;

said first lead connected to a non-central location of said first electrically conductive plate.

8. A flexible connector assembly as in claim 7, wherein the flexible connector assembly is arranged in a line of opposing pairs of flexible connector assemblies; and wherein the first leads in each pair are more widely spaced than central locations of the corresponding first electrically conductive plates.

9. A flexible connector assembly as in claim 7, wherein said first and second plates comprise first and second polygonal plates.

10. A flexible connector assembly as in claim 7, wherein said second lead is connected to a non-central location of said second electrically conductive plate.

11. A flexible connector assembly as in claim 7, wherein said plurality of flexible conductors are connected to said first electrically conductive plate at symmetric locations relative to a center thereof.

12. A method of making a flexible connector assembly for use in a generator terminal assembly comprising:

connecting a first lead to a non-central location of a first electrically conductive plate;

connecting a second lead to a second electrically conductive plate; and connecting the first and second electrically conductive plates together with a plurality of flexible conductors.

13. A method as in claim 12, wherein the first lead is connected to a non-central location of the first electrically conductive plate so that when the flexible connector assembly is adjacent at least one other flexible connector assembly of the generator terminal assembly, a current flowing in the flexible connector assembly is substantially evenly distributed among the respective plurality of flexible conductors.

14. A method as in claim 12, wherein the flexible connector assembly is to be positioned in a line of opposing pairs of flexible connector assemblies; and wherein the first leads in each pair are more widely spaced than central locations of the corresponding first electrically conductive plates.

15. A method as in claim 12, wherein the first and second plates comprise first and second polygonal plates.

16. A method as in claim 12, wherein the plurality of flexible conductors are connected to the first electrically conductive plate at symmetric locations relative to a center thereof.

17. A method as in claim 12, wherein the first lead is connected to the first electrically conductive plate adjacent a perimeter thereof.

* * * * *